US006269425B1

(12) United States Patent
Mounes-Toussi et al.

(10) Patent No.: US 6,269,425 B1
(45) Date of Patent: Jul. 31, 2001

(54) ACCESSING DATA FROM A MULTIPLE ENTRY FULLY ASSOCIATIVE CACHE BUFFER IN A MULTITHREAD DATA PROCESSING SYSTEM

(75) Inventors: Farnaz Mounes-Toussi, Minneapolis; Donald Lee Freerksen, Rochester, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/137,548

(22) Filed: Aug. 20, 1998

(51) Int. Cl.[7] ..................................................... G06F 12/08
(52) U.S. Cl. .......................... 711/133; 711/158; 711/143; 711/146; 711/122
(58) Field of Search ..................................... 711/118, 133, 711/136, 143, 144, 146, 158, 134, 135, 122; 709/107, 103

(56) References Cited

U.S. PATENT DOCUMENTS

| | | | |
|---|---|---|---|
| 4,463,420 | * | 7/1984 | Fletcher ................................. 711/133 |
| 5,038,278 | * | 8/1991 | Steely, Jr. et al. ..................... 711/133 |
| 5,287,508 | * | 2/1994 | Hejna, Jr. et al. ..................... 709/102 |
| 5,535,361 | * | 7/1996 | Hirata et al. ........................... 711/145 |
| 5,574,875 | * | 11/1996 | Stansfield et al. ......................... 711/3 |
| 5,797,004 | * | 8/1998 | Lindholm et al. ..................... 709/104 |
| 5,809,522 | * | 9/1998 | Novak et al. .......................... 711/118 |
| 5,909,695 | * | 6/1999 | Wong et al. ........................... 711/133 |
| 5,946,711 | * | 8/1999 | Donnelly ............................... 711/152 |
| 5,974,438 | * | 10/1999 | Neufeld .................................. 709/104 |
| 6,000,011 | * | 12/1999 | Freerksen et al. .................... 711/118 |
| 6,038,647 | * | 3/2000 | Shimizu ................................. 711/168 |

OTHER PUBLICATIONS

Handy, Jim, "The Cache Memory Book", Academic Press, Inc 1993; pp. 73–75 and 128–129.*

Dixon et al, "Working Set Development Through Dual Layered Caching", IBM Technical Disclosure Bulletin, V. 25, No. 11B, pp. 5998–6002.*

Israel et al., *Chip set aims to speed secondary cache*, Electronic Engineering Times, Jun. 19, 1995, pp. 78–79.

Stiliadis et al., *Selective Victim Caching: A Method To Improve the Performance of Direct–Mapped Caches*, IEEE, Proceedings of the 27th Annual Hawaii International Conference on Systems Sciences, 1994, pp. 412–421.

Jouppi, Norman P., *Improving Direct–Mapped Cache Performance by the Addition of a Small Fully–Associative Cache and Prefetch Buffers*, IEEE, 17th Annual International Symposium on Computer Architecture, 1990, pp. 364–373.

\* cited by examiner

*Primary Examiner*—Reginald G. Bragdon
(74) *Attorney, Agent, or Firm*—Wood, Herron & Evans

(57) ABSTRACT

A memory cache system including at least one cache, for use in a multithread environment in which each memory access, and each cache line storing data, is associated with the thread generating the memory access, or the thread which caused storage of the data in the cache line. The cache system tracks the number of threads attempting to access data in a cache buffer line, in order to prioritize loading of data into cache buffer lines based on the number of threads awaiting loading of data into each line. Furthermore, the system determines whether the thread associated with data removed from a cache due to aging, matches the thread associated with the new data being added to the cache, and prioritizes storage of cast back data for which there was a thread match, above storage of cast back data for which there was not a thread match. Also, the system attempts to store data that is being cast back as a result of snooping an attempted access of data, prior to attempting to store data that is being stored or cast back for other reasons. Also, the cache buffer attempts to load data that is to be filled into another cache, before attempting to load data that will not be filled into another cache.

22 Claims, 8 Drawing Sheets

ACCESSING DATA FROM A MULTIPLE ENTRY FULLY ASSOCIATIVE CACHE BUFFER IN A MULTITHREAD DATA PROCESSING SYSTEM

FIELD OF THE INVENTION

The present invention relates to management of a memory cache in a manner which improves cache performance.

BACKGROUND OF THE INVENTION

In a data processing system, instructions and associated data are transferred from memory to one or more processors for processing, and then resulting data generated by the processor is returned to memory for storage. Thus, typical processing operations involve frequent and repetitive reading and writing from memory. As a result, memory access delays are often a primary limitation in the performance of a data processing system. Preferably, therefore, memory access speed should be maximized to maximize performance. However, often cost and other constraints require that the main memory be comprised of relatively long access time circuitry. To overcome the resulting performance drawbacks, memory caches are typically used.

A memory cache typically includes a relatively small, but high speed, bank of memory, which can be more rapidly accessed by the processor(s) than the main memory. Memory locations in the main memory are duplicated in the cache. When a particular memory location being accessed by the processor is duplicated in the cache—event which is known as a cache "hit"—the processor may rapidly access the cache instead of waiting for access to main memory. The cache is managed with the goal of maximizing the fraction of accesses which are hits in the cache.

Caches are typically organized into "lines", which are relatively long sequences of memory locations found in main memory. Typically, when a memory location accessed by a processor is not duplicated in the cache—an event which is known as a cache "miss"—an entire line containing the missed memory location, and neighboring memory locations, is brought into the cache as part of retrieving the missed location from other caches or main memory—an event which is known as a "linefill" into the cache.

Typically, each cache line is associated with multiple groups of locations in the main memory. Each cache line stores duplicates of associated groups of memory locations, as well an indication of which groups of memory locations are currently stored in that line. Thus, when a processor requests access to a particular memory location, the cache line corresponding to that memory location is accessed to determine whether that cache line is storing the group of memory locations which includes the requested location. If so, the requested memory location is accessed in the cache. If not, a group of memory locations including the requested location is linefilled into the cache.

Typically, an n-way associative cache stores n of the several groups of locations corresponding to a cache line in the cache at one time. When a group of memory locations is linefilled into the cache, memory contents in the same cache line may need to be replaced. If the contents of the replaced cache line have been modified, then the line has to be stored back into the corresponding group of locations in the main memory—an event which is known as a "castback" or "writeback" from the cache.

In high performance data processing systems, often there are two or more caches, organized so that a processor attempts to access a memory location by first attempting to locate a duplicate of that location in a "level 1" or L1 cache. If there is a miss in the L1 cache, then an attempt is made to locate a duplicate of the desired memory location in a "level 2" or L2 cache. If there is a miss in the L2 cache, each lower level cache is sequentially checked in the same manner. If there is a hit in one of the caches, then the desired memory locations are obtained from that cache, and typically, the accessed memory locations are duplicated, along with neighboring locations completing a cache line, into the appropriate line of at least the L1 cache—although in some cases an access may be "cache-inhibited", in which case the data is not stored in the L1 cache after retrieval. If there are misses in all of the caches, the missed location, along with neighboring locations completing a cache line, is retrieved from main memory, and filled into one or more of the caches if the access is not cache-inhibited. Similarly, if a line is cast back from a cache, the line may be written to a higher level cache, main memory, or both.

Typically, lines of instructions and data are transferred from caches and processors to other caches and processors using buffers. For instance, in one architecture two buffers are respectively connected to a level 1 cache and a level 2 cache. These buffers are also connected to main memory, a host processor, and possibly other processors via a system bus. The buffers allow for a smooth transition of data or instructions between components having different transfer rates. Each line in a conventional cache buffer strictly handles either fill commands or write back commands, and includes memory space which can store a finite number of cache lines, e.g., four. Each cache line in a buffer is, therefore, designated as a fill cache line or a write back cache line. In a multi-way associative cache, cache buffer lines may be used for fills or writebacks, and are dynamically configured for the appropriate purpose.

In addition to the use of caches to improve memory access performance, other well known techniques have been used to improve the performance of data processing systems. One technique is to divide a processing task into independently executable sequences of instructions called threads. Using this technique in a single-processor system, when the processor, for any number of reasons, cannot continue processing or execution of a thread, the processor switches to another thread and continues processing of that thread, rather than stalling. For example, when a cache miss stalls processing of one thread, the processor may switch to other threads which are able to continue processing. By the time the processor returns to the stalled thread, the missed location may have been linefilled into the cache, and that thread can resume with minimal additional delay. Furthermore, the processor may switch threads on a timed basis even where no threads are stalled. Alternatively, in a multi-processor system, each processor may handle one or more threads executing in parallel, so that when one thread or one processor is stalled, the other threads or processors may continue. For the purposes of this application, the terms "thread" and "multithreading" will be used to refer generally to any processing system, whether comprising a single processor or multiple processors, which executes multiple threads.

The term "multithreading", when used in the context of software, is used to refer to a particular organization scheme which can be used in writing computer programs. In this software context, therefore, "multithreading" does not relate to the manner in which computer programs are physically executed. Thus, software "multithreading" is different from the kind of "multithreading" discussed in this application.

The kind of multithreading to which this application relates, may be referred to as "hardware multithreading", i.e., processor configurations permitting a single processor to switch between multiple threads of instructions upon various conditions, or permitting multiple processors to process multiple threads of instructions. Thus, in this application, the terms "thread" and "multithreading" will be understood to refer to "hardware multithreading", and not methods for software organization.

While the technique of multithreading, and the use of memory caches, both enhance the performance of a data processing system, combining these techniques raises substantial complexities. In particular, as noted above, when a memory access misses in the L1 cache, the required memory contents must be accessed from a higher level cache or main memory. When the memory contents are located, they must be delivered to the requesting processor, and also filled into one of the caches. While this process appears straightforward, in a multithreading environment or other environments where there may be multiple outstanding cache misses, efficient management of this process becomes substantially more difficult.

In particular, when multiple threads are simultaneously executing, the threads may be accessing memory locations mapped to the same cache line. As a consequence, the cache line may be repeatedly replaced as the threads access the different memory locations.

Furthermore, multiple simultaneously executing threads may increase the number of sequential accesses to memory which are directed to memory locations distant from each other. Since a group of local accesses can be more rapidly processed in memory than accesses which are distant from each other, the introduction of multiple threads can increase the overall access time to memory.

Accordingly, there is a need for a cache which is managed in a manner to improve its performance, particularly in a multithreaded and/or multiprocessor environment.

SUMMARY OF THE INVENTION

In accordance with principles of the present invention, a memory cache system including at least one cache, is used in a multithread environment in which each memory access, and each cache line storing data, is associated with the thread generating the memory access, or the thread which caused storage of the data in the cache line. The cache is efficiently managed by prioritizing loading and storing of data to and from the cache system, based on the threads that are associated with memory accesses and data in cache lines.

In the specific embodiment described below, a memory cache accumulates a count of the number of threads awaiting loading of data to a cache line, and uses this count to prioritize the loading of data into cache lines. The count is accumulated by storing an indication that a thread is awaiting loading of data to a cache line, when the thread is prevented from accessing data because the data is not as yet loaded into the cache line. The memory cache prioritizes loading of data into cache lines by attempting to load data into a cache line with respect to which a first number of threads are awaiting loading of data, before attempting to load data into a cache line with respect to which a second smaller number of threads are awaiting loading of data.

In this specific embodiment, when the memory cache must make room for newly-accessed data, the memory cache selects a line of previously-stored data to be cast back from the cache. As part of this process, the memory cache compares the thread associated with the previously-stored data, with the thread accessing the newly-accessed data, to determine whether there is a thread match. The cache system then prioritizes data being cast back from a cache by attempting to store data for which there was a thread match, prior to attempting to store data for which there was not a thread match.

In the described embodiment, the cache system includes snoop functions for identifying whether an attempt is being made to access data from a cache or other storage at a time when there is a newer version of the data in another cache. In such a situation, the newer version of the data is cast back from the cache, and storage of the newer data is prioritized above other activities of the cache system.

In the specific embodiment described below, there are a plurality of caches, one of which is a cache buffer. The cache buffer buffers data that is to be stored into another cache, delivered to a processor executing a thread, or stored to main memory, and performs the various prioritization methods described above. Specifically, the cache buffer tracks the number of threads attempting to access data in a cache buffer line, in order to prioritize loading of data into cache buffer lines based on the number of threads awaiting loading of data into each line. Furthermore, the buffer receives, along with data being cast back from a cache, a signal indicating whether a thread match occurred, and prioritizes storage of data being cast back from a cache, based on whether a thread match occurred. Also, the buffer receives an indication whether data is being cast back as a result of snooping an attempted access of the data, and prioritizes storage of data by attempting to store data received as a result of snooping an attempted access of data, prior to attempting to store data received for other reasons. Also, the cache buffer prioritizes loading of data by attempting to load data that is to be filled into another cache, before attempting to load data that will not be filled into another cache.

These and other features and advantages, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

DETAILED DESCRIPTION

Figure 1:
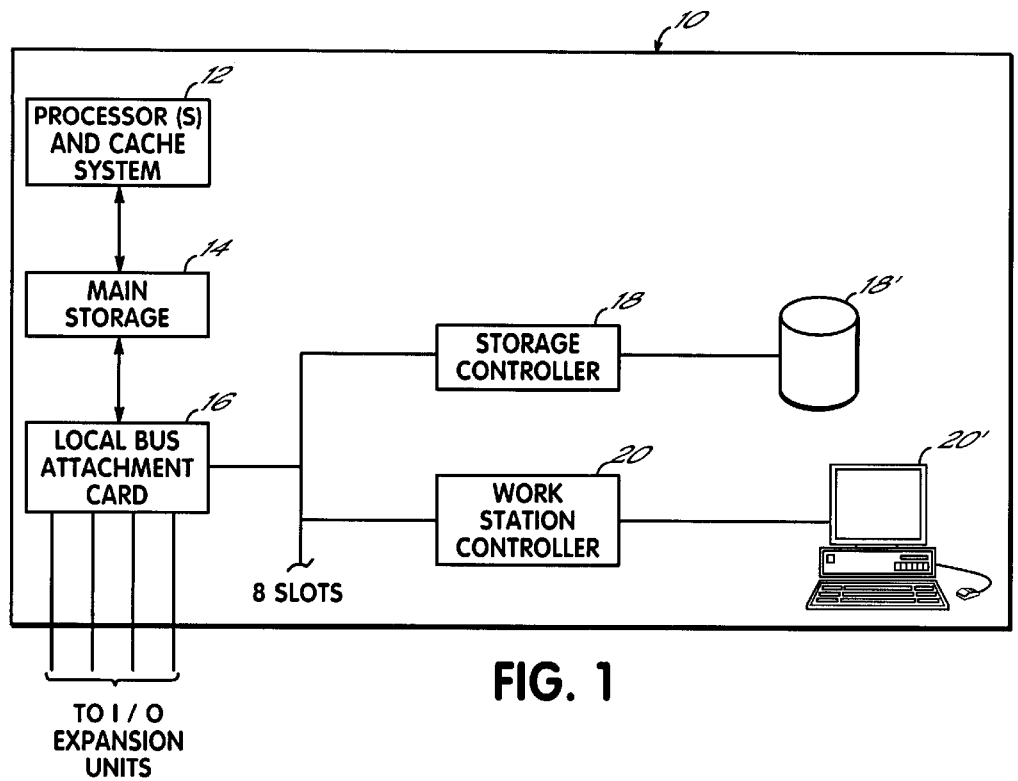
FIG. 1 is a block diagram of a system processing unit including processor(s) and cache system, main memory, and peripheral devices, implementing principles of the present invention in accessing a main memory.

As seen in FIG. 1, a typical computer system utilizing principles of the present invention comprises a system processing unit 10 including one or more system processors and cache systems 12, a main storage unit 14, a local bus attachment card 16 including modules for connecting fiber optic cables leading to input/output expansion units, a storage controller 18, with storage device 18', and work station controller 20, with work station 20'.

Figure 2A:
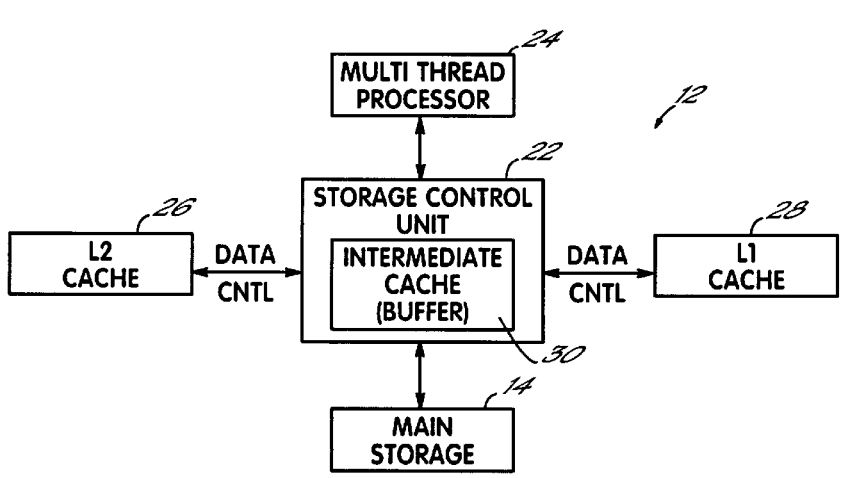
FIG. 2A is a block diagram of a single multithreaded processor used in conjunction with a cache system in accordance with principles of the present invention.
Figure 2B:
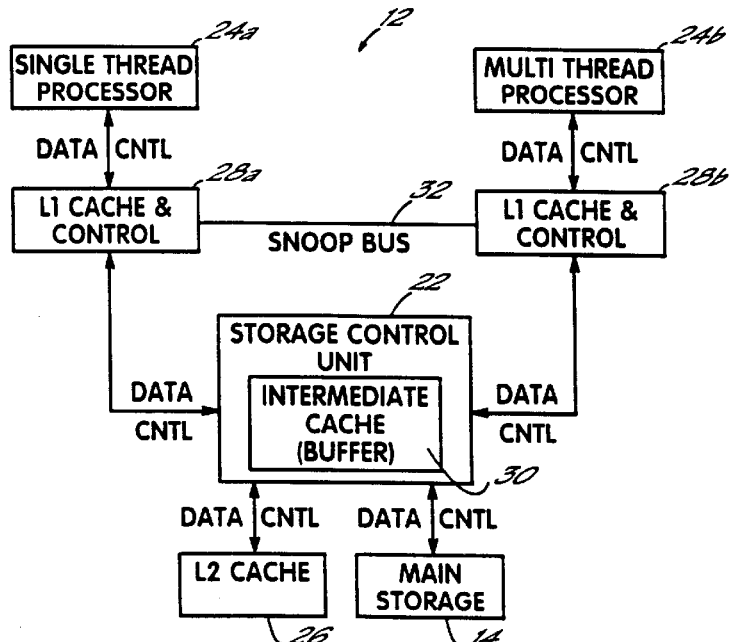
FIG. 2B is a block diagram of a plurality of single- and multi-threaded processors used in conjunction with a cache system in accordance with principles of the present invention.

FIG. 2A illustrates a storage control 22 in accordance with principles of the present invention utilized in connection with a single multi-thread processor 24. In accordance with principles of the present invention as described in more detail below, storage control unit 22 manages data utilized by the multiple threads in a manner to enhance memory performance. For the purposes of illustration, the processing system described in connection to storage control unit 22 is a single-processor multi-thread computing system; however, principles of the present invention are equally applicable to a multi-processor multi-thread processing system as illustrated in FIG. 2B, so long as each thread executed by the multiple processors may be uniquely identified and managed in the manner described below.

Referring to FIG. 2A, the processor 24 of the computer system, interact with storage control unit 22 to obtain data and instructions to execute a multi-thread computer program. Processor 24 access a memory location via storage control unit 22 by delivering a memory access request to storage control unit 22. Using circuitry and functionality described below, storage control unit 22 responds by obtaining the requested data, and delivering the data to processor 24, or by receiving the data from processor 24.

Storage control unit 22, implementing principles of the present invention, controls the input and output of data from/to processor 24 using various storage units, including caches, buffers and main memory. Storage control unit 22 further manages the delivery and input of instructions to processor 24.

As shown in FIG. 2A, storage control unit 22 interfaces with main storage 14. Main storage 14 typically comprises a bank of relatively high-volume, moderate speed memory such as one or more DRAM chips. Main storage 14 implements a paging memory management scheme; specifically, the moderate speed memory stores pages of memory locations which have been swapped out of a bank of mass storage (see 18', FIG. 1), facilitating more rapid access to these memory locations.

Each storage location in main storage 14 is associated with an address, which uniquely identifies that memory location among all of the memory locations in main storage 14. To access a memory location, an address is delivered to main storage 14, and in response main storage 14 delivers the contents of the identified memory location.

To provide high speed access to frequently used memory locations, storage control unit 22 further interfaces with a number of cache memories, which comprise relatively high-cost, high speed memories. These caches include a level 1 or L1 cache 28 and a level 2 or L2 cache 26.

L1 cache 28 stores a relatively few, e.g., 512 or 1024, cache lines. Each cache line stores a copy of a group of sequential memory locations in main storage 14, e.g., 128 sequential memory locations. Every address in main storage 14 is uniquely associated with a line in L1 cache 28; the associated line in L1 cache 28 for a particular address can be determined from a subset of the bits of the address. Through the same association, each cache line in L1 cache 28 is associated with several groups of sequential addresses that might be stored in that cache line. At any time, a cache line in L1 cache 28 can store a copy of sequential memory locations for a small number, e.g., two of the address ranges associated with that cache line.

L1 cache 28 incorporates a directory identifying which sequential memory locations are being stored in L1 cache 28. Specifically, the L1 cache directory stores an indication of the ranges of addresses of the memory locations in main storage 14 for which copies currently reside in, i.e., are resident in, a line of L1 cache 28. As noted above, multiple different groups of sequential memory locations in main storage 14 may map to the same line in L1 cache 28; accordingly, the L1 cache directory identifies which of the multiple different groups of memory locations in main storage 14 are resident in L1 cache 28.

L2 cache 26 is similar to L1 cache 28. Each line in L2 cache 26 is associated with a number of groups of sequential memory addresses, a number of which may be stored in the associated L2 cache line at one time. Further, L2 cache 26 is associated with an L2 cache directory (see FIG. 3, below). Each entry in the L2 cache directory identifies ranges of addresses of the memory locations stored in L2 cache 26. To identify whether a desired address is resident in L2 cache 26, selected bits from the address are used to select a uniquely associated one of the entries in the L2 cache directory, and then the address ranges stored in the selected L2 cache directory entry are compared to the desired address.

Most accesses are subject to buffering within storage control unit 22 before delivery to processor 24. Specifically, storage control unit 22 includes a cache buffer 30, also known as a transition cache, for managing the delivery of data from/to processor 24 to/from L1 cache 28, L2 cache 26 and/or main storage 14. Cache buffer 30 includes a small number, e.g., eight lines of data storage, each line capable of storing the same quantity of data as a line in L1 cache 28 and L2 cache 26. The eight lines in cache buffer 30 are used to buffer lines stored in L1 cache 28 and L2 cache 26 or corresponding groups of memory locations in main storage 14, as data is transferred between the caches 28, 26 and main storage 14.

Each line in cache buffer 30 stores data identifying the current use and status of the cache buffer line; specifically, whether the line is in use, and if so the kind of access for which the line is being used, the status of servicing the access and the address of the access, as well as other detailed information discussed below in connection with FIG. 4. As discussed in detail below, whenever there has been a miss in the L1 cache 28, and data must be obtained from the L2 cache 26 or main storage 14, a line in cache buffer 30 is assigned to the miss, so that when the data is returned from the L2 cache 26 or main memory, the data is stored in the assigned line of cache buffer 30, and then transferred from this line to the L1 cache 28, L2 cache 26 and/or to processor 24. Similarly, whenever the retrieval of a line into the L1 cache 28 or L2 cache 26 or other conditions require a castback from a line to L2 cache 26 or to main storage 14, a line of cache buffer 30 is assigned to the castback, so that the data is cast back from the L1 cache 28 or L2 cache 26 into the assigned line of cache buffer 30, and then transferred from this line to L2 cache 26 or main storage 14.

The assignment of cache lines to particular accesses and castbacks, and the process of obtaining data for accesses and castbacks into the cache buffer 30 and delivering the data out of the cache buffer 30, is managed by logic in storage control unit 22 using the data stored therein. These operations and the activities are described in detail below with reference to FIGS. 5–9.

It will be appreciated that other processors or processing systems and cache systems (not shown in FIG. 2A) may be connected to main storage 14 for loading and storing data. In this situation, the cache system may perform a "snooping" function for detecting that another processor, processing system or cache system, is attempting to access data in main storage 14 at a time when there is a newer version of the data in one of the caches 26 and 28, so that, and in-such a situation, the newer data can be cast back to main storage 14 prior to the other access. To accomplish this function, each of L1 cache 28, L2 cache 26 and storage control unit 22 monitor communications to main storage 14 over the system bus, and compare the address of any accesses produced by other processors, processing systems or cache systems, to the addresses of data stored in L1 cache 28, L2 cache 26 and storage control unit 22. If there is a match, and the data has been modified, the L1 cache 28 or L2 cache 26 casts the data back to cache buffer 30, and storage control unit 22, after receiving the snooping castback from a cache, or upon recognizing that data already in cache buffer 30 matches a request, casts the data back to main storage 14.

Referring now to FIG. 2B, in an alternative embodiment, a cache system in accordance with the present invention is utilized in a multiprocessor, multithread environment. As in FIG. 2A, the cache system comprises a storage control unit 22 having a cache buffer 30, interfaced to an L2 cache 26, and to main storage 14. In this environment, however, there is a processing system comprising a plurality, e.g., two processors 24a and 24b, each independently performing one or more threads. For the purposes of example, in FIG. 2B processor 24a is illustrated as a single thread processor and processor 24b is illustrated as a multi-thread processor; however, it will be appreciated that the plural processors used in such a processing system may all be single or multi-thread processors, or any combination of single and multi-thread processors. Furthermore, in the embodiment of FIG. 2B, each of processors 24a and 24b is associated with a separate L1 cache 28a or 28b. L1 caches 28a and 28b cache data loaded and stored by the associated processor 24a and 24b, and incorporate control circuitry for responding to memory access commands from the connected processor 24a or 24b to deliver or receive those commands and associated data, as well as determine when to cast back data from the L1 cache 28a or 28b to L2 cache 26 or to main memory.

L1 caches 28a and 28b are coupled together by a snoop bus 32 for performing a snooping function. Specifically, each L1 cache 28a and 28b identifies, over snoop bus 32, the address of data being accessed by the cache. Furthermore, each L1 cache 28a and 28b monitors the snoop bus 32 to evaluate the accesses being performed by the other L1 cache, in order to determine when to cast data back to L2 cache 26. Specifically, when a first L1 cache detects that a second L1 cache is attempting to access data in main storage 14 at a time when there is a newer version of the data in the first L1 cache, the first L1 cache casts the newer data back to L2 cache 26 so that the newer data is in L2 cache 26 or cache buffer 30 prior to completion of the second L1 cache's access.

In the embodiment of FIG. 2b, storage control unit 22 performs functions similar to those described in connection with FIG. 2a, with the exception that memory access commands are routed from each processor 24a and 24b to the separate control logic in L1 caches 28a and 28b, and thus storage control unit 22 need not directly interface with processors 24a and 24b, but rather interfaces with the processors via the L1 caches 28a and 28b.

Figure 3:
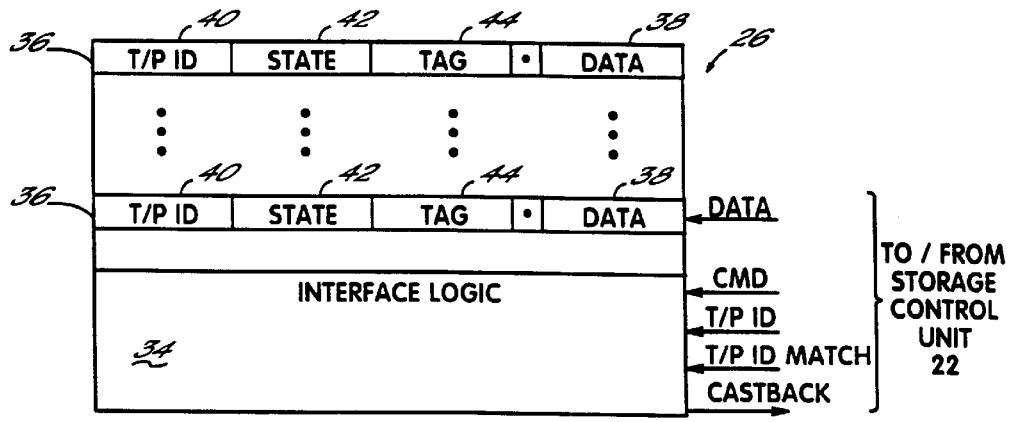
FIG. 3 is a block diagram of the contents of the L2 cache illustrated in FIGS. 2A and 2B.

Referring now to FIG. 3, details of the L2 cache 26 can be explained. L2 cache 26 comprises interface logic circuitry for communicating with storage control unit 22, and a plurality of cache lines 36 each for storing cached data. Lines 36 comprise a number of control fields and a field 38 for storing the cached data. The control fields necessary for carrying out principles of the present invention, include a thread/processor ID field 40, a state field 42 for identifying the state of the line (empty, in use, valid/invalid, modified), and a tag field 44 for identifying the address in main storage 14 to which the data in field 38 corresponds.

L2 cache 26 is responsive to commands and data received from storage control unit 22 to save or retrieve data from lines 36. Notably, commands delivered by storage control unit 22 include an identification of the thread/processor which generated the command. When a store command is received by L2 cache 26, L2 cache 26 stores the data associated with the command in an appropriate line 36 of cache 26, and also stores the thread/processor identifier delivered with the command into field 40 of the line 36. If, during processing of a load or store command, the interface logic 34 in L2 cache 26 determines that valid data previously saved in a line 36 of the L2 cache 26 must be cast back from L2 cache 26, to provide room for new data, then L2 cache 26 delivers an aging castback command to storage control unit 22, causing the data from the line to be emptied to be transferred to a buffer in storage control unit 22. As part of this process, interface logic 34 compares the thread/processor identifier delivered with the load or store command, to the thread/processor identifier stored in field 40 of the line to be emptied, and produces a boolean "T/P ID MATCH" signal to storage control unit 22 along with the resulting aging castback command. Storage control unit 22 utilizes the T/P ID MATCH signal in the manner described below when handling the data buffered as a consequence of the aging castback command.

Figure 4:
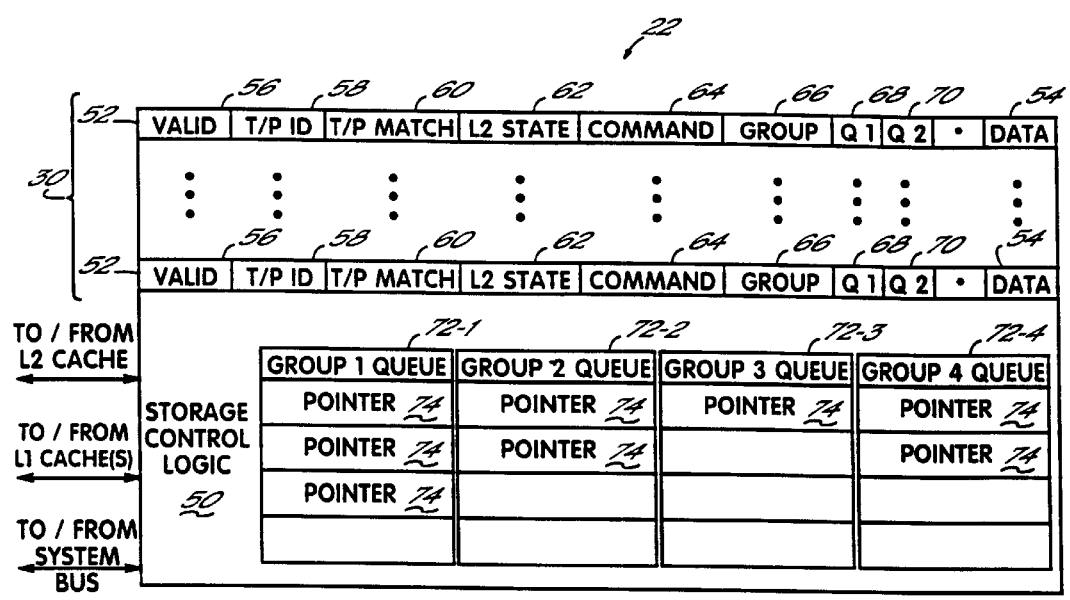
FIG. 4 is a block diagram of the storage control unit illustrated in FIGS. 2A and 2B.

Referring now to FIG. 4, details of the storage control unit 22 can be explained. Storage control unit 22 comprises storage control logic circuitry 50 for communicating with L2 cache 26, L1 cache(s) 28 and main storage 14, and a plurality of cache buffer lines 52 each for storing cached data.

Cache buffer lines 52, which collectively comprise the cache buffer 30, each include a number of control fields and a field 54 for storing the cached data. The control fields necessary for carrying out principles of the present invention, include a valid field 56 for indicating whether the data in the line 52 is valid, a thread/processor ID field 58 for associating the data stored in field 54 with a thread/processor identifier, a T/P ID MATCH field 60 for storing the T/P MATCH signal produced by L2 cache interface logic 34 (FIG. 3), an L2 state field 62 for identifying the state of processing of the buffered data in the line, a command field 64 for storing the memory access command for which the data has been buffered, a group field 66 for identifying the command as a member of one of four prioritized groups, and two flags Q1 and Q2 for indicating the state of processing of the command. The functions of these fields will be discussed in further detail below in connection with the flow charts of FIGS. 5–9.

Storage control logic 50 includes various elements for communicating with L2 cache 26, L1 cache(s) 28 and main storage 14, as well as four queues 72-1, 72-2, 72-3 and 72-4. Queues 72 are comprised of registers, each register storing a pointer to one of the lines 52 in cache buffer 30. The queues 72 are used in prioritizing action upon the various buffered data in cache buffer 30, as explained in further detail below. As noted below, each line in buffer 30 is assigned to one of four priority groups, and a pointer to the line is inserted in the appropriate one of the four queues 72-1, 72-2, 72-3 or 72-4.

The pointers stored in the four queues 72, in cooperation with the data in the L2 state field 62 and Q1 and Q2 flags 68 and 70, provide complete information on the state of processing of a buffer line 52.

When a command is first delivered to storage control logic 50, as described below with reference to FIGS. 5 and 6, a buffer line 52 is allocated for use in managing the command. If the command is a store or castback command, the associated data is also loaded into field 54 of the allocated buffer line 52. Also, the command is assigned to a priority group based on the type of the command, and the group number is stored in the field 66 of the allocated buffer line 52. Thereafter, as is described below with reference to FIG. 8, a pointer to the buffer line 52 is incorporated into one of the four queues 72 based on whether the command in the buffer line was assigned to the first, second, third or fourth priority group. Finally, to carry out the commands, as is described below with reference to FIG. 9, storage control logic 50 scans the pointers in each of the four queues 72 to select the command that should be executed first, and proceeds to attempt execution of the selected command.

As part of selecting commands for execution from the queues 72, the storage control unit 50 makes use of information available in the T/P ID field 58 and the L2 state field 62 of the buffer lines 52. This data is maintained to indicate the status and relative importance of each line 52 in buffer 30. The TIP ID field stores identifiers for each of the threads/processors which are awaiting completion of a command utilizing a buffer line 52. As is described below with reference to FIG. 5, whenever a thread or processor requests access to data, buffer 30 is updated to keep track of the identifier of the thread or processor requesting access, so that the T/P ID field 58 stores both the number and identity of the threads awaiting delivery of data to a line 52. This information can then be used to prioritize the execution of the commands in a particular line 52, as described below.

The L2 state field provides information on filling of data into the line 52 in response to a load command. Specifically, L2 state field may have the following values:

| L2 state | Status of buffer line 52 |
| --- | --- |
| L1 MISS SENT TO L2 | A load command generated a miss in the L1 caches and has been delivered to a buffer line 52 to seek the desired data in the L2 cache. The command has yet to be successfully forwarded to the L2 cache. |
| L1 MISS TAKEN BY L2/FILLING | The L2 cache contained the data sought by a load command and the data is or will be filled from the L2 cache. |
| L1 MISS FILLED BY L2 | The data sought by a load command has been filled into field 54 of the buffer line 52 from the L2 cache. |
| L2 MISS SENT TO BUS | A load command generated a miss in both the L1 and L2 caches and the desired data will be sought in main storage 14. The load command has yet to be successfully forwarded to main storage. |
| L2 MISS TAKEN BY BUS/FILLING | The load command has been successfully sent to main storage 14 and the desired data is or will be filled from main storage 14. |
| L2 MISS FILLED BY BUS | The data sought by a load command has been filled into field 54 of the buffer line 52 from main storage 14. |

As will be appreciated, after a load command has generated a miss in the L1 cache, the L2 state field for the associated buffer line 52 is set to "L1 MISS SENT TO L2", and the L2 state field is subsequently altered as the status of the buffer line 52 changes. As is described below with reference to FIG. 9, the state identified in the L2 state field 62 of buffer lines 52 can be used to prioritize accesses which have generated L2 misses, over accesses which have not generated L2 misses.

Figure 5:
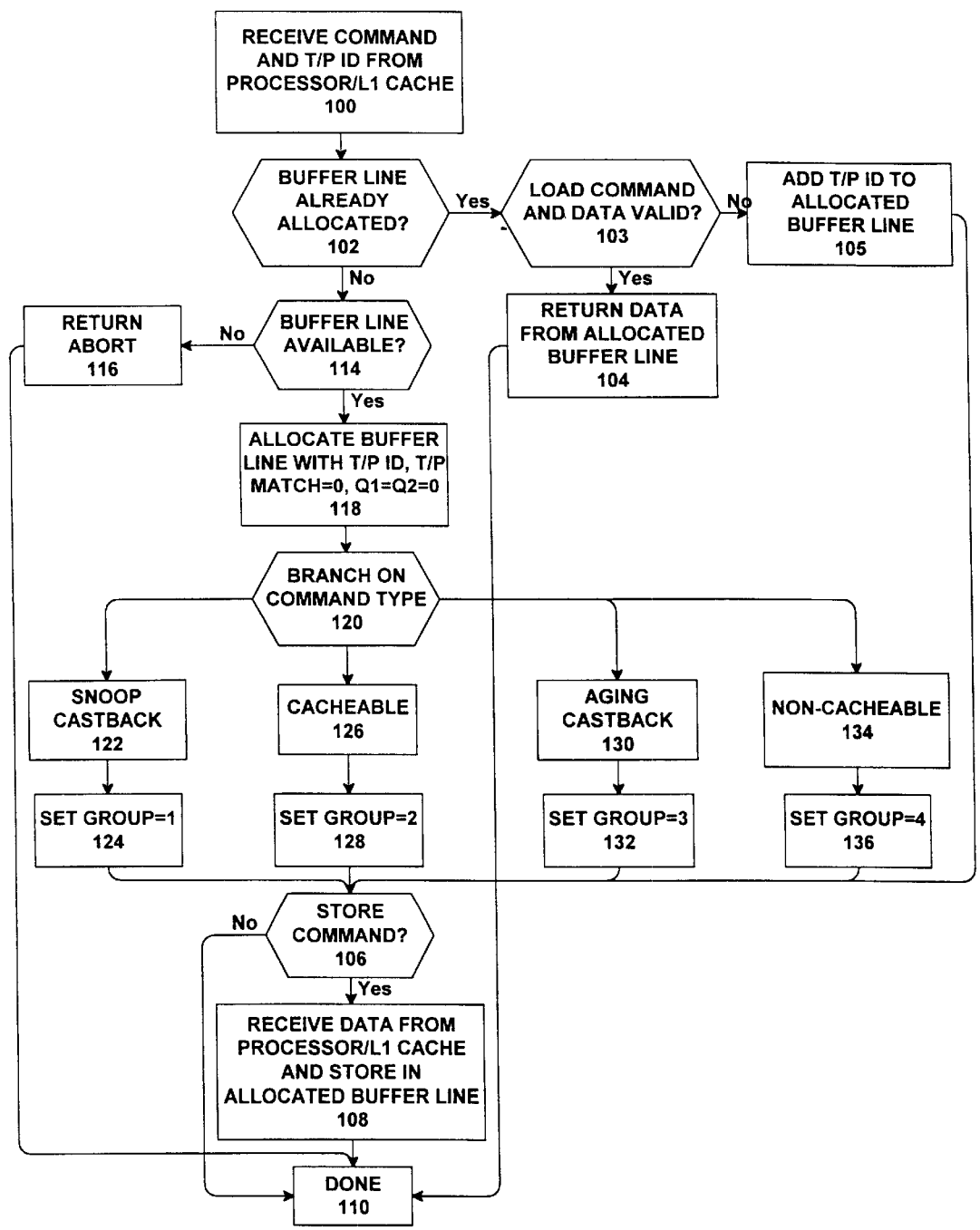
FIG. 5 is a flow chart of operations performed by the storage control unit of FIG. 4 in response to receipt of a memory access command from a processor or L1 cache.

FIG. 5 illustrates a specific process carried out by storage control logic 50 in response to receipt (step 100) of a command from a processor in the arrangement of FIG. 2A or a command received from control logic in an L1 cache in the arrangement of FIG. 2B. It will be noted that, with the exception of castback commands from the L2 cache, which are described below with reference to FIG. 6, all commands received by the storage control logic 50 in storage control unit 22 are originated by a processor in FIG. 2A or by the L1 control logic in the arrangement of FIG. 2B.

Initially, in response to a command from a processor/L1 cache, storage control logic 50 evaluates the currently allocated buffer lines, i.e. those lines marked valid in field 56, to identify whether there is already an allocated buffer line for the data being accessed by the command (step 102). If there is already an allocated buffer line for the same data, then in step 103 storage control logic 50 determines whether the command is a load command and the data in the allocated buffer line is marked valid, i.e., determines whether the load command can be immediately satisfied using the data in the buffer line. In this circumstance, storage control logic 50 proceeds to step 104 and returns the requested data from the allocated buffer line, and processing of the command is completed (step 110). Alternatively, if the command is not a load command or the data in the allocated buffer line is not marked valid, then storage control logic 50 stores the thread/processor identifier for the newly-received request into the T/P ID field 58 of that buffer line (step 105). As a result, the buffer line identifies that an additional thread/processor is awaiting return of the data associated with the buffer line. Subsequently, after step 105, if the command is a store command (step 106), then in step 108 the storage control unit receives the data to be stored and places this data into field 54 of the allocated buffer line. After this step, or immediately after step 106 if the command is not a store command, the initial processing of the command is completed (step 110).

If in step 102, there is not a buffer line already allocated for the data that is the subject of the received command, then storage control logic 50 proceeds to step 114, in which storage control logic 50 determines whether there is an available buffer line. To determine this, storage control logic 50 seeks a buffer line 52 with its VALID flag in field 56 set to "invalid". If no such line is available in buffer 30, then in step 116 storage control logic 50 returns an abort—which will cause the thread/processor or L1 cache which generated the command to retry later—and processing of the command is done (step 110).

If in step 114 there is a buffer line available, then storage control logic 50 proceeds to step 118 in which a buffer line is allocated to the command. This involves, first, marking the buffer line "valid" in field 56. Then, the thread/processor identifier delivered with the command, is stored into field 58 of the buffer line. Also, the T/P MATCH, Q1 and Q2 fields are initialized to zero values. Subsequently, the GROUP field 66 is initialized to a value appropriate for the kind of command that was received (step 120). Specifically, if the command is a snoop castback from an L1 cache (step 122), as discussed with reference to FIG. 2B, above, then the GROUP field 66 is initialized with a value of 1 (step 124), placing the command in the highest priority group for subsequent processing. If the command is a cacheable load or store command (step 126), then the GROUP field 66 is initialized with a value of 2 (step 128). If the command is an aging castback from the L1 cache (step 130), then the GROUP field 66 is initialized with a value of 3 (step 132). Finally, if the command is a non-cacheable load or store (step 134), then the GROUP field 66 is initialized with a value of 4, placing the command in the lowest priority group for subsequent processing (step 136). As part of these steps, the L2 state field 62 is also set to the appropriate value, based on whether the data is cast back, loaded or stored.

Figure 6:
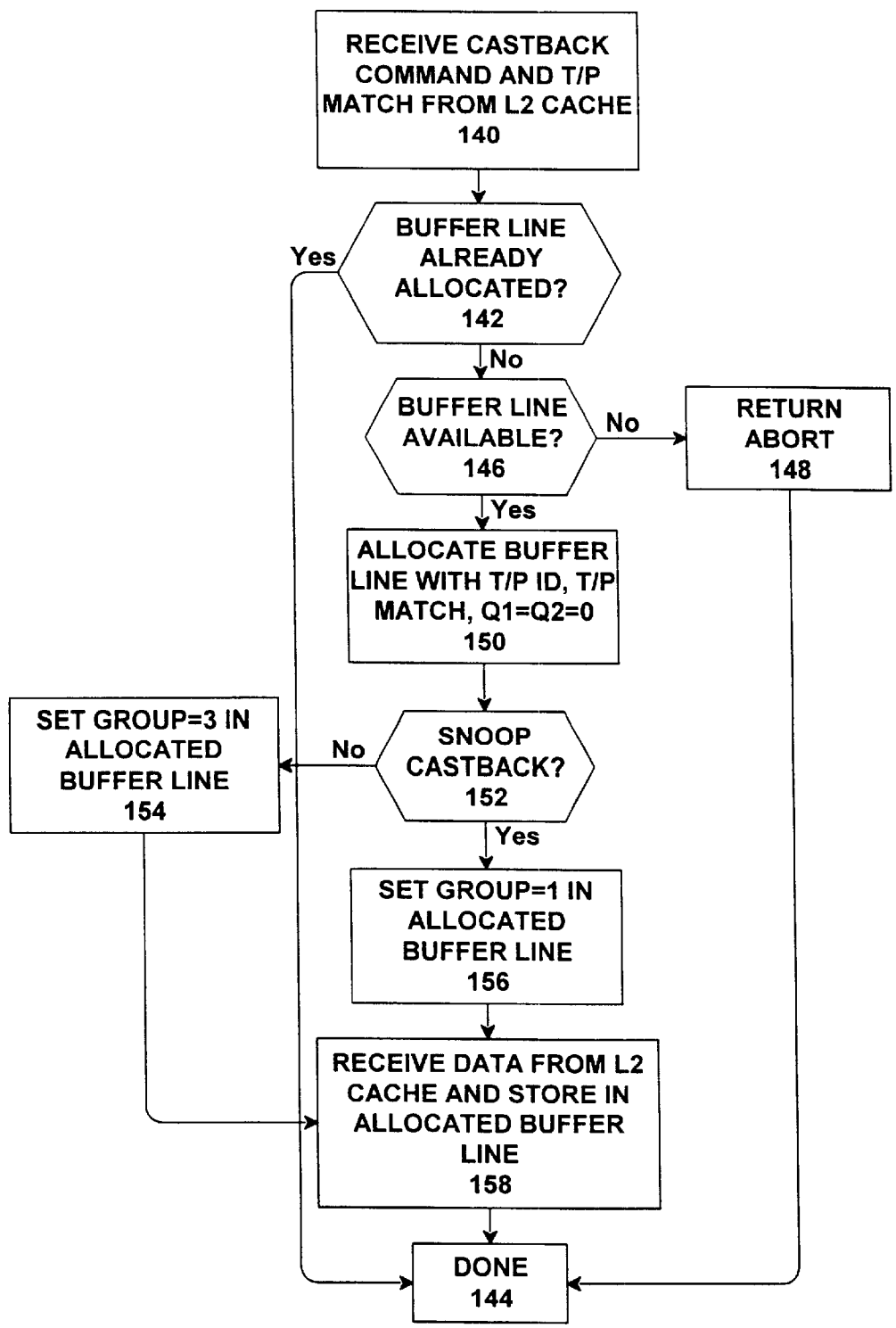
FIG. 6 is a flow chart of operations performed by the storage control unit of FIG. 4 in response to receipt of an L2 cache castback command.

Referring now to FIG. 6, another circumstance in which a command is received by storage control logic 50, is a castback from the L2 cache, whether due to aging or snooping by the L2 cache (step 140). In this circumstance, storage control logic 50 first determines in step 142 whether there is a buffer line already allocated for the data which is being cast back. If so, then there is already a more recent version of the data in cache buffer 30, and accordingly the cast back data can be ignored, and processing is done (step 144).

If, however, there is not an allocated line in buffer 30 for the cast back data, then in step 146 storage control logic 50 evaluates the VALID flags in the cache buffer lines as described above, to determine whether there is a buffer line available to store the castback command and data. If not, then in step 148 an abort is returned to the L2 cache, causing the L2 cache to retry the castback command at a later time.

If, however, there is a buffer line available, then in step 150 a buffer line is allocated for the castback command. This buffer line is initialized by setting the VALID field 56 of the line to "valid", storing the thread or processor identifier delivered by the L2 cache with the castback command into the T/P ID field 58 of the line, and storing the T/P MATCH signal returned from the L2 cache into the T/P MATCH field 60 of the line. Finally, the Q1 and Q2 flags in field 68 and 70 are initialized to values of 0.

After allocating the buffer line, different actions are taken based on the type of castback command that was received (step 152). If the castback command is an aging castback, then the GROUP field 66 of the allocated buffer line is set to a value of 3 (step 154). If, however, the castback command is a snooping castback, then the GROUP field 66 of the allocated buffer line is set to a value of 1 (step 156). Thus, the castback command is appropriately prioritized into one of groups 1 or 3. Finally, in step 158, the data being cast back is received from the L2 cache and stored in the data field 54 of the allocated buffer line, and processing is done (step 144).

Figure 8:
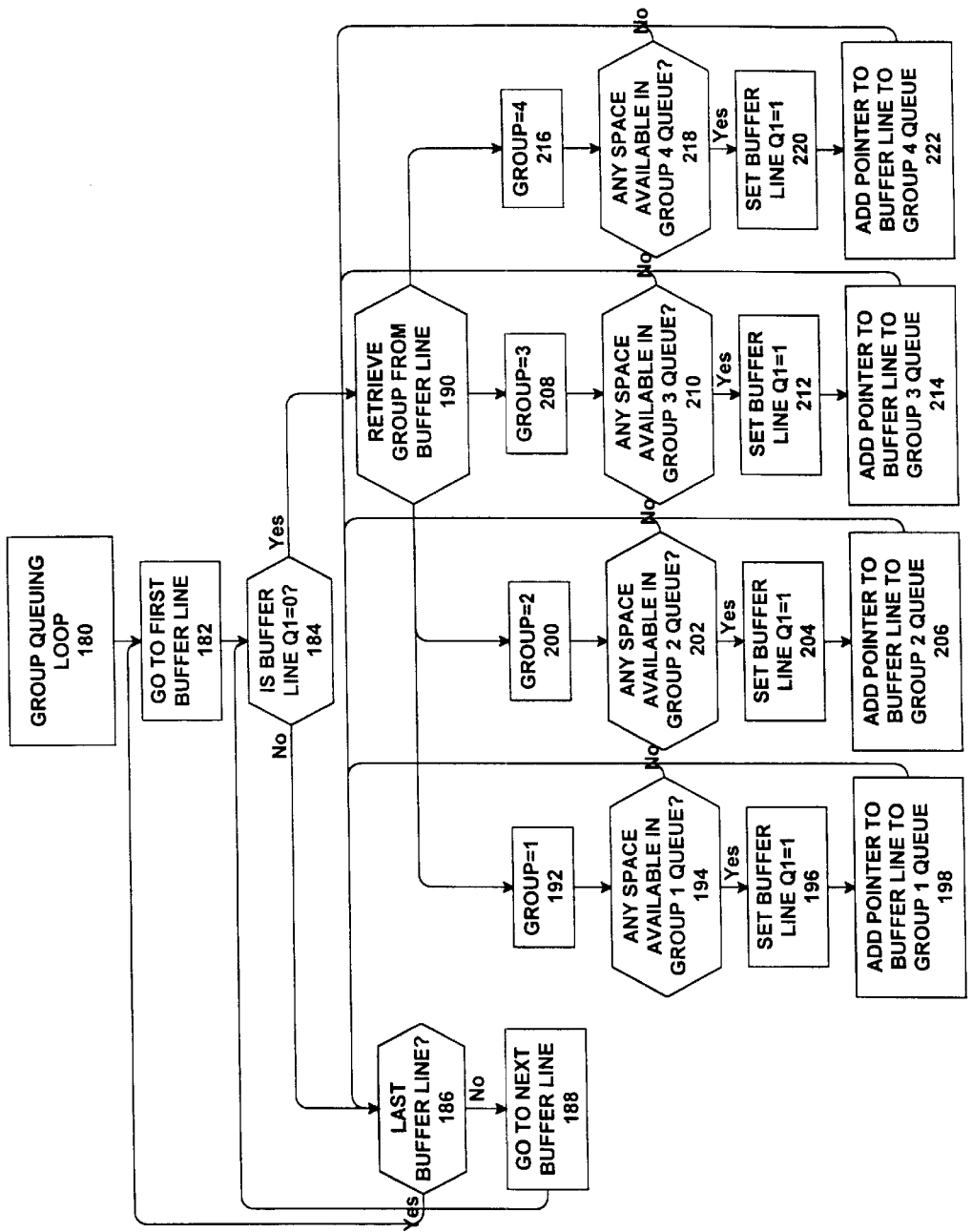
FIG. 8 is a flow chart of operations performed by the storage control unit of FIG. 4 in managing queues of buffer lines.
Figure 9:
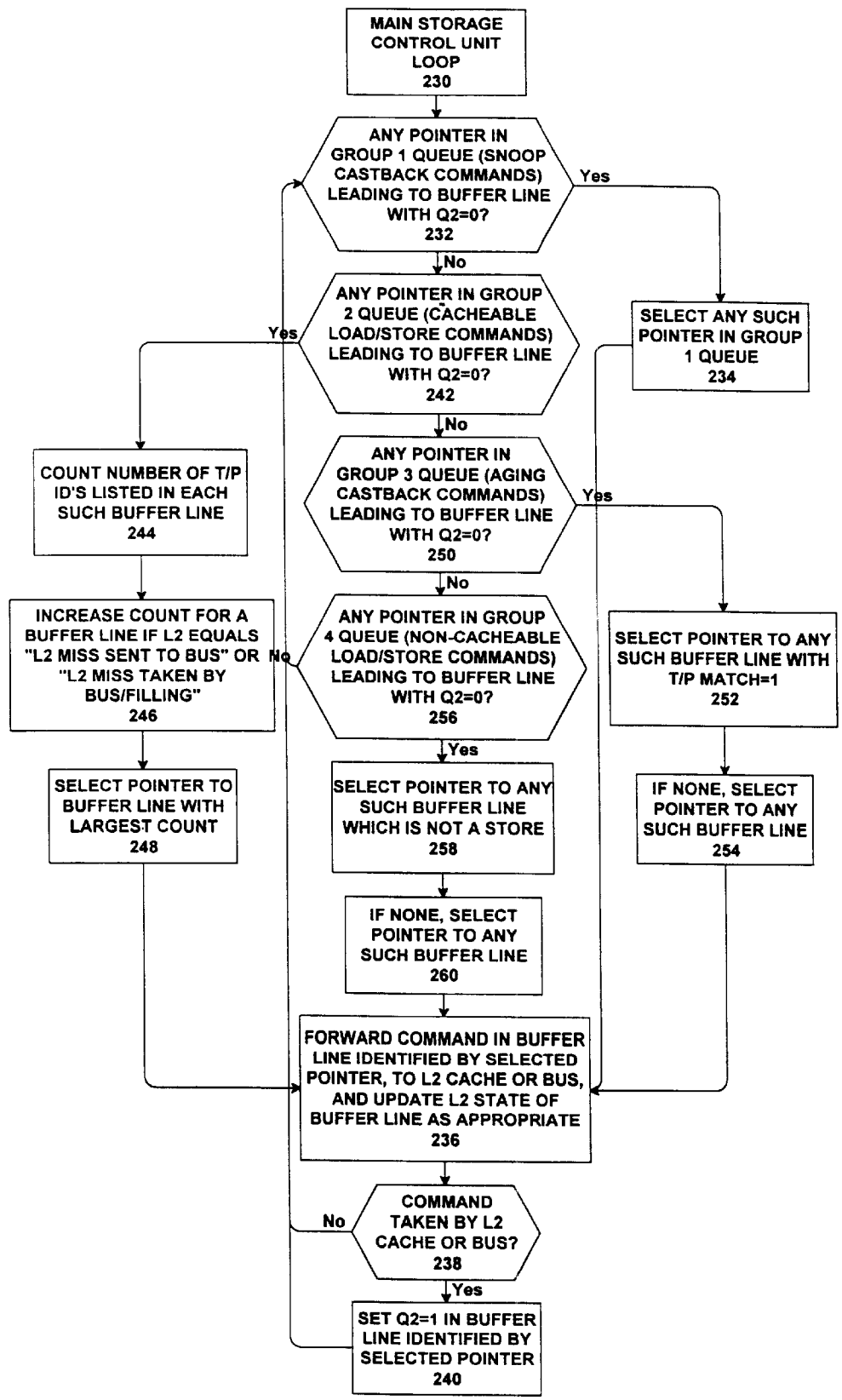
FIG. 9 is a flow chart of operations performed by the storage control unit of FIG. 4 in selecting a buffer line for processing.

Once a cache buffer line 52 has been allocated in the manner described in FIGS. 5 and 6, then the cache buffer line is processed in response to the values stored in the T/P ID, T/P MATCH, L2 STATE, COMMAND and GROUP fields in the manner generally described in FIGS. 8 and 9, to cause the desired command to be executed and the data to be delivered or returned through the allocated buffer line. In at least one circumstance, however, the GROUP field 66 may be modified after the line has been allocated.

Figure 7:
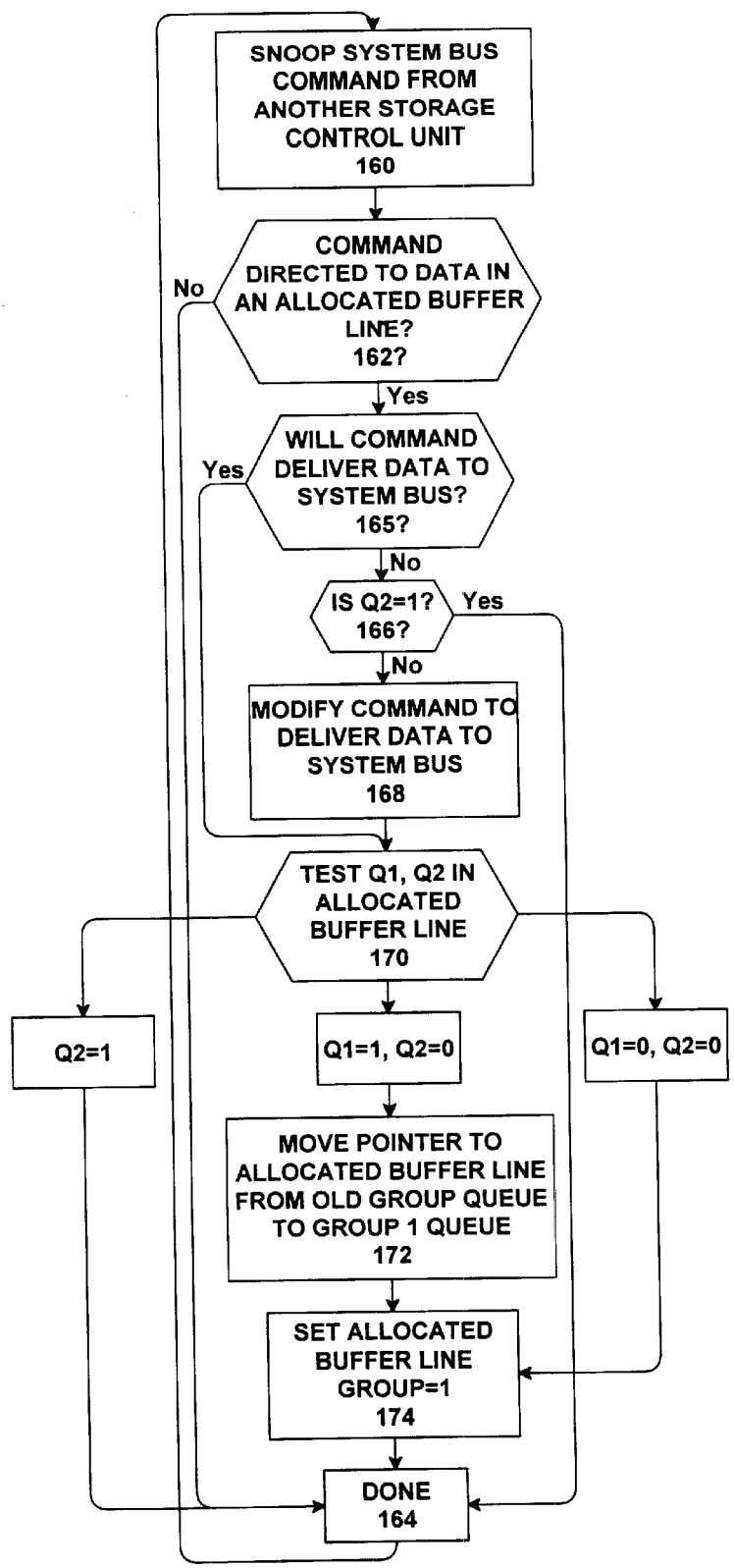
FIG. 7 is a flow chart of operations performed by the storage control unit of FIG. 4 as part of snooping accesses performed by other storage control units.

Specifically, referring to FIG. 7, if the storage control logic 50 is configured to snoop commands on the system bus originating from other storage control units (step 160), then each command on the system bus will be compared to lines in the cache buffer 30 to determine whether the command is directed to data in an allocated buffer line (step 162). If not, then the snooping process with respect to reprioritization of the current command is done (step 164).

If, however, the command is directed to data in an allocated buffer line, then execution of the command in the allocated buffer line may need to be altered and/or reprioritized to cause the data in the allocated buffer line to be routed to the system bus as early as possible. Accordingly, in step 165, storage control logic 50 determines whether the command is of a type which will deliver the data to the system bus. It will be noted that some commands, deliver data only to the L2 or L1 cache and/or processor, and do not also deliver the data to the system bus. Such commands must be modified to also deliver the data to the system bus. If in step 165, it is determined that the command will not deliver data to the system bus, then in step 166, the buffer line is analyzed to determine if the Q2 flag is set. As will be seen below, the Q1 and Q2 flags respectively identify whether the command in a buffer line has been queued and whether the command, once queued, has been successfully executed. Accordingly, to determine whether and how to modify a buffer line, storage control logic 50 may test the values of Q1 and Q2. In step 166, the value of Q2 is tested to determine whether the command for the buffer line has been successfully executed. If so, then no further action can be taken and processing is done. However, if the original command has not already been successfully executed, then in step 168 the command is modified so that the data is only delivered to the system bus.

After step 165 or 168, in step 170 the Q1 and Q2 flags are evaluated to determine the appropriate next step.

If the command in the allocated buffer line has already been successfully executed, in which case Q2=1, the command has already been successfully executed, and therefore no reprioritization is needed. Accordingly, in this circumstance, the snooping process with respect to reprioritization of the current command is done (step 164).

If Q2=0 but Q1=1, then a pointer to the allocated buffer line has already been added to one of the group queues 72, but the command has not yet been executed. In this situation, the pointer must be moved as part of reprioritizing the execution of the command in the line. Therefore, in this circumstance, storage control logic 50 proceeds to step 172 and moves the pointer from the group queue 72 identified by the GROUP field 66 in the buffer line, into the group 1 queue 72-1. Then, in step 174, storage control logic 50 stores the value 1 into the GROUP field 66 in the buffer line to be consistent with the new location of the pointer.

As a final alternative, a pointer to the allocated buffer line may not yet have been added to any of the group queues. In this circumstance, Q1=0 and Q2=0. Since there is no pointer in any of the group queues to move, in this situation storage control logic 50 moves directly to step 174 and stores the value 1 into the GROUP field 66 of the buffer line so that a pointer to the buffer line will be placed in group 1 by the process of FIG. 8.

Referring now to FIG. 8, after allocation, pointers to buffer lines are inserted into one of the four group queues 72 by a queuing process 180. This process is illustrated in FIG. 8 as a sequential loop, although it will be understood that this process could be equivalently performed by process-specific hardware performing the various search and data manipulation steps shown in FIG. 8 in parallel.

At the beginning of the loop shown in FIG. 8, storage control logic 50 starts at the first valid buffer line, i.e., the first buffer line with its VALID field 56 having a value of 1 (step 182), and evaluates whether the Q1 flag in the line has the value of 0, indicating that the line has not yet been queued. If the line has been queued and Q1=1, then storage control logic 50 determines if the line is the last valid buffer line (step 186). If not, storage control logic 50 proceeds to the next valid buffer line (step 188) and returns to step 184 to evaluate whether that line has been queued. When the last valid buffer line is reached in step 186, then the storage control logic 50 returns to step 182 and the first valid buffer line.

When a valid buffer line is identified which has not been queued, then in step 190 the buffer line is placed in the queue identified by the GROUP field 66 in the buffer line. Specifically, if the GROUP field 66 has a value of 1 (step 192), then storage control logic 50 determines (step 194) whether there is any space available in the group 1 queue 72-1. If not, then storage control logic 50 returns to step 186 to evaluate another buffer line. However, if there is space in the group 1 queue, then in step 196 storage control logic 50 sets Q1=1 in the buffer line, indicating that the buffer line has been queued, and then in step 198 adds a pointer to the buffer line into the group 1 queue 72-1. After step 198, storage control logic 50 returns to step 186 to evaluate another buffer line.

Similar steps to steps 192, 194, 196 and 198 are taken if the GROUP field 66 of the identified line has the value of 2 (steps 200, 202, 204 and 206), 3 (steps 208, 210, 212 and 214) or 4 (steps 216, 218, 220 and 222), in each case adding a pointer to the line to the group 2 queue 72-2, group 3 queue 72-3 or group 4 queue 72-4, respectively, if there is room available in the queue.

Referring now to FIG. 9, once one or more commands have been stored into buffer line(s) and pointer(s) the buffer line(s) have been appropriately queued as described above, then a main storage process 230 will attempt to execute the commands stored in those buffer line(s). This process is illustrated in FIG. 9 as a sequential loop, although it will be understood that this process could be equivalently performed by process-specific hardware performing the various search and data manipulation steps shown in FIG. 9 in parallel. In either case, attempts to execute commands are prioritized so that execution is attempted for more critical commands before execution is attempted for less critical commands.

In the loop illustrated in FIG. 9, initially, in step 232 storage control logic 50 determines whether there are any pointers in the group 1 queue, which lead to a buffer line with Q2=0. These pointers, if any, lead to snoop castback commands that have not as yet been successfully executed, and are given the highest priority. If there is one or more such pointers, then in step 234 any one of the pointers is selected. Subsequently, in step 236, the command in the buffer line identified by the selected pointer is forwarded to the L2 cache or bus, as appropriate, to determine if the command will be accepted. In the case of an L1 castback to the L2 cache, the command may be aborted by the L2 cache if the L2 cache is busy, or may be accepted by the L2 cache. In the case of an L2 castback to main storage, the command may be aborted by main storage if main storage is busy, or may be accepted by main storage. In step 238, the storage control logic 50 determines whether the command was accepted, and if so, in step 240, the Q2 flag in the buffer line identified by the selected pointer is set to Q2=1. Otherwise, if the command has been aborted or otherwise not satisfied, then storage control logic 50 returns to step 232 to restart its prioritized execution of commands.

If there are no group 1 pointers with Q2=0 in step 232, then storage control logic 50 proceeds to step 242, and determines whether there are any pointers in the group 2 queue, which lead to a buffer line with Q2=0. These pointers, if any, lead to cacheable load/store commands that have not as yet been successfully executed, and are given the next highest priority. If there is one or more such pointers, then in step 244, for each such pointer, a count is generated of the number of thread/processor identifiers listed in the T/P ID field 58 of the line it identifies. This count reflects the number of threads or processors waiting for a command to be completed, and is a measure of the relative priority that should be assigned to the command. In addition, in step 246, a count is increased if the L2 STATE field 62 of the associated cache line indicates that the L2 cache is awaiting return of the results, i.e., if the L2 STATE field 62 has the value "L2 MISS SENT TO BUS" or "L2 MISS TAKEN BY BUS/FILLING". In either case, the count is increased to reflect that the L2 cache is also awaiting the results, along with any identified threads or processors. In step 248, the accumulated counts are compared, and a pointer to a buffer line with the largest count is selected. Subsequently, in step 236, the command in the buffer line identified by the selected pointer is forwarded to the L2 cache or bus, as appropriate, to determine if the command will be accepted. The appropriate destination of the command is determined by the L2 STATE field 62, which as noted above tracks the progress of a command. Depending upon the response received, i.e. either an abort, a "miss" or "hit" in the case of a load command directed to a cache, or an acceptance in the case of a store command directed to a cache or any command directed to main storage, the L2 STATE field 62 of the buffer line is appropriately updated. In step 238, the storage control logic 50 determines whether the command was successfully executed, i.e., there was a "hit" in the case of a load command directed to a cache, or the command was accepted in the case of a store command directed to a cache or any command directed to main storage. If so, in step 240, the Q2 flag in the buffer line identified by the selected pointer is set to Q2=1. Otherwise, if the command has been aborted or otherwise not satisfied, then storage control logic 50 returns to step 232 to restart its prioritized execution of commands.

If in steps 232 and 242 there are no pointers in the first two queues, then in step 250, storage control logic 50 determines whether there are any pointers in the group 3 queue, which lead to a buffer line with Q2=0. These pointers, if any, lead to aging castback commands that have not as yet been successfully executed, and are given the next highest priority. If there is one or more such pointers, then in step 252 storage control logic 50 selects any pointer leading to a line with its T/P MATCH field 60 equal to zero. If the T/P MATCH field has a value of zero, then the thread which caused the aging castback is not the same as the thread which originally caused the cast back data to be cached. Data that was cached by another thread or processor is likely to be used by that other thread or processor when it is next executing. Accordingly, to prevent repeated swapping of the cache lines as a result of thread switches, a command with T/P MATCH=1 is prioritized higher for execution than a command with TIP MATCH=0, to increase the likelihood that the data for a command with T/P MATCH=0 will be in the cache buffer 30 when it is re-accessed by the other thread or processor. If there is no pointer leading to a buffer line with T/P MATCH=1, then, in step 254 any pointer to a buffer line with T/P MATCH=0 is selected. Subsequently, in step 236, the command in the buffer line identified by the selected pointer is forwarded to the L2 cache or bus, as appropriate, to determine if the command will be accepted. In the case of an L1 castback to the L2 cache, the command may be aborted by the L2 cache if the L2 cache is busy, or may be accepted by the L2 cache. In the case of an L2 castback to main storage, the command may be aborted by main storage if main storage is busy, or may be accepted by main storage. In step 238, the storage control logic 50 determines whether the command was accepted, and if so, in step 240, the Q2 flag in the buffer line identified by the selected pointer is set to Q2=1. Otherwise, if the command has been aborted or otherwise not satisfied, then storage control logic 50 returns to step 232 to restart its prioritized execution of commands.

If in steps 232, 242 and 250 there are no pointers in the first three queues, then in step 256 storage control logic 50 determines whether there are any pointers in the group 4 queue, which lead to a buffer line with Q2=0. These pointers, if any, lead to noncacheable load/store commands that have not as yet been successfully executed, and are given the lowest priority. If there is one or more such pointers, then in step 258 any pointer leading to a line with a non-store command is selected. Load commands are prioritized above store commands because a thread or processor must wait for a load to complete before continuing processing, but need not wait for a store to complete before continuing processing. If there are no non-store commands, then in step 260 any pointer in the group 4 queue to a line with Q2=0 is selected. Then, in step 236, the command in the buffer line identified by the selected pointer is forwarded to the bus, to determine if the command will be accepted. Depending upon the response received, i.e. either an abort or an acceptance, the L2 STATE field 62 of the buffer line is appropriately updated. In step 238, the storage control logic 50 determines whether the command was successfully executed, i.e., the command was accepted. If so, in step 240, the Q2 flag in the buffer line identified by the selected pointer is set to Q2=1. Otherwise, if the command has been aborted, then storage control logic 50 returns to step 232 to restart its prioritized execution of commands.

The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A memory-cache system for use in a multithread processing environment in which memory accesses are associated with a processing thread which generated the memory access, the system comprising:

a cache configured for connection to a main memory system and a processing system for receiving from said processing system memory access commands identifying a thread and data to be stored in said main memory system or data to be loaded from said main memory system, said cache loading data from and storing data to said main memory system in response to said memory access commands, said cache further including a plurality of lines each for caching data passed between said processing system and said cache in response to a memory access command, each line associating said data with the thread identified by the memory access command, a cache storage control circuit, the storage control circuit managing loading of data from said main memory system to said cache and storing of data to said main memory system from said cache, said storage control circuit accumulating counts of the number of threads awaiting loading of data to a plurality of cache lines said storage control circuit prioritizing loading of data to the cache system, based on said counts of the number of threads that are awaiting loading of data in cache lines.

2. The memory-cache system of claim 1 wherein said cache accumulates said count by storing an indication that a thread is awaiting loading of data to a cache line, when a memory access command identifying the thread cannot be immediately serviced by the cache because data is not as yet loaded into the cache line.

3. The memory-cache system of claim 2 wherein said cache prioritizes loading of data into cache lines by attempting to load data into a cache line with respect to which a first number of threads are awaiting loading of data, before attempting to load data into a cache line with respect to which a second smaller number of threads are awaiting loading of data.

4. The memory-cache system of claim 1 wherein said cache performs a snoop function for identifying whether an attempt is being made to access data from another location at a time when there is a newer version of said data in said cache, and in such a situation, casting back said newer version from said cache.

5. The memory-cache system of claim 4 wherein said cache attempts to cast back said newer version of said data being cast back from said cache before attempting to store other data.

6. The memory-cache system of claim 1 further comprising a cache buffer, said cache buffer comprising a plurality of lines each buffering data that is to be stored into another cache, delivered to said processor system, or stored in said main memory, said cache buffer prioritizing loading and storing of data to and from said main memory based on threads that are associated with memory accesses and data in cache lines.

7. The memory-cache system of claim 6 wherein said cache buffer prioritizes loading of data from main memory by attempting to load data that is to be filled into another cache, before attempting to load data that will not be filled into another cache.

8. The memory-cache system of claim 6 wherein said cache buffer accumulates a count of the number of threads awaiting loading of data to a cache buffer line, and said cache buffer utilizes the count accumulated for a plurality of cache buffer lines when prioritize loading of data into said plurality of cache buffer lines.

9. The memory-cache system of claim 8 wherein said cache buffer accumulates said count by storing an indication that a thread is awaiting loading of data to a cache buffer line, when a memory access command identifying the thread cannot be immediately serviced by the cache buffer because data is not as yet loaded into the cache buffer line.

10. The memory-cache system of claim 9 wherein said cache buffer prioritizes loading of data into cache buffer lines by attempting to load data into a cache buffer line with respect to which a first number of threads are awaiting loading of data, before attempting to load data into a cache buffer line with respect to which a second smaller number of threads are awaiting loading of data.

11. The memory-cache system of claim 6 wherein said cache creates room for newly-accessed data by selecting a line of previously-stored data to be cast back from the cache, and stores the cast back data in said main memory.

12. The memory-cache system of claim 11 wherein as part of creating room for newly accessed data, said cache compares the thread associated with the previously-stored data, with the thread accessing the newly-accessed data, to determine whether there is a thread match.

13. The memory-cache system of claim 12 wherein said cache buffer prioritizes data being stored in said main memory as a consequence of being cast back from the cache, by attempting to store data for which there was not a thread match, prior to attempting to store data for which there was a thread match.

14. The memory-cache system of claim 6 wherein said cache performs a snoop function for identifying whether an attempt is being made to access data from another location at a time when there is a newer version of said data in said cache, and in such a situation, casting back said newer version from said cache.

15. The memory-cache system of claim 14 wherein said cache buffer attempts to store said newer version of said data being cast back from said cache before attempting to store other data.

16. A method of managing a cache system comprising a cache having a plurality of lines, connected between a main memory system and a processing system for receiving from said processing system memory access commands identifying a thread and data to be stored in said main memory system or data to be loaded from said main memory system, the method comprising:

loading data from and storing data said main memory system in response to said memory access commands, caching data into lines of said cache in response to a memory access command, and associating said data with the thread identified by the memory access command, accumulating a count of the number of threads awaiting loading of data to a plurality of cache lines, prioritizing loading of data from said main memory system to said cache based on said counts of the number of threads that are awaiting loading of data in cache lines.

17. The method of claim 16 further comprising accumulating said count by storing an indication that a thread is awaiting loading of data to a cache line, when a memory access command identifying the thread cannot be immediately serviced by the cache because data is not as yet loaded into the cache line.

18. The method of claim 17 further comprising prioritizing loading of data into cache lines by attempting to load data into a cache line with respect to which a first number of threads are awaiting loading-of data, before attempting to load data into a cache line with respect to which a second smaller number of threads are awaiting loading of data.

19. The method of claim 16 further comprising performing a snoop function by identifying whether an attempt is being made to access data from another location at a time when there is a newer version of said data in said cache, and in such a situation, casting back said newer version from said cache.

20. The method of claim 19 further comprising attempting to cast back said newer version of said data being cast back from said cache before attempting to store other data.

21. A memory-cache system for use in a multithread processing environment in which memory accesses are associated with a processing thread which generated the memory access, the system comprising:

a cache configured for connection to a main memory system and a processing system for receiving from said processing system memory access commands identifying a thread and data to be stored in said main memory system or data to be loaded from said main memory system, said cache loading data from and storing data to said main memory system in response to said memory access commands, said cache further including a plurality of lines each for caching data passed between said processing system and said cache in response to a memory access command, each line associating said data with the thread identified by the memory access command, a cache storage control circuit, the storage control circuit managing loading of data from said main memory system to said cache and storing of data to said main memory system from said cache, and creating room for newly-accessed data by selecting a line of previously-stored data to be cast back from the cache, by comparing a thread associated with previously-stored data with the thread accessing the newly-accessed data, and attempting to cast back data for which there was a thread match, prior to attempting to cast back data for which there was not a thread match.

22. A method of managing a cache system comprising a cache having a plurality of lines, connected between a main memory system and a processing system for receiving from said processing system memory access commands identifying a thread and data to be stored in said main memory system or data to be loaded from said main memory system, the method comprising:

loading data from and storing data said main memory system in response to said memory access commands, caching data into lines of said cache in response to a memory access command, and associating said data with the thread identified by the memory access command, creating room for newly-accessed data by selecting a line of previously-stored data to be cast back from the cache, and storing the cast back data in said main memory, wherein selecting a line of previously-stored data comprises comparing a thread associated with previously-stored data with the thread accessing the newly-accessed data, and attempting to cast back data for which there was a thread match, prior to attempting to cast back data for which there was not a thread match.

* * * * *